United States Patent
Honma et al.

(10) Patent No.: US 6,486,628 B2
(45) Date of Patent: Nov. 26, 2002

(54) ENERGIZATION CONTROL SYSTEM OF A MOTOR

(75) Inventors: Chiaki Honma, Aichi-ken (JP); Masanori Sugiyama, Aichi-ken (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 09/881,105

(22) Filed: Jun. 15, 2001

(65) Prior Publication Data

US 2002/0017891 A1 Feb. 14, 2002

(30) Foreign Application Priority Data

Jun. 16, 2000 (JP) ........................................ 2000-182216

(51) Int. Cl.[7] ................................................ H02P 1/18
(52) U.S. Cl. ........................ 318/254; 318/138; 318/439; 318/721
(58) Field of Search ................................ 318/701–839, 318/138, 254, 439, 618, 602, 561

(56) References Cited

U.S. PATENT DOCUMENTS 4,558,265 A * 12/1985 Hayashida et al. ......... 318/561
6,246,193 B1 * 6/2001 Dister ....................... 318/254

FOREIGN PATENT DOCUMENTS

| JP | 07-274569 | 10/1995 |
| JP | 2000-270591 | 9/2000 |

* cited by examiner

Primary Examiner—Khanh Dang
(74) Attorney, Agent, or Firm—Sughrue Mion, PLLC (57) ABSTRACT

The energization control system for a motor equalizes the power loss of switching elements energizing coils of each phase of the motor in order to maintain a balance of heat development. The energization control system for a motor includes a plurality of phase coils and two switching elements. The energization control system of a motor supplies an electric current from the power source line to the coil when two switching elements are simultaneously conducted. Two switching elements are controlled under a first condition that one of the switching elements is switched every predetermined time while the other of the switching elements is conducted. Two switching elements are also controlled under a second condition that the other of the switching elements is switched every predetermined time while one of the switching elements is conducted. The first condition and the second conditions are repeated and synchronized to the predetermined time every predetermined period.

4 Claims, 11 Drawing Sheets

ENERGIZATION CONTROL SYSTEM OF A MOTOR

The present application is based on and claims priority under 35 U.S.C. § 119 with respect to Japanese Patent Application No. 2000-182216 filed on Jun. 16, 2000, the entire contents of which are incorporated herein by reference.

FIELD OF THE INVENTION

The present invention relates to energization control systems for a motor. More particularly, the present invention pertains to an energization control system for a motor for controlling electric current in a coil of each phase of a switched reluctance type motor (called an SR motor hereinafter) applied, for instance, to electric vehicles.

BACKGROUND OF THE INVENTION

Figure 10:
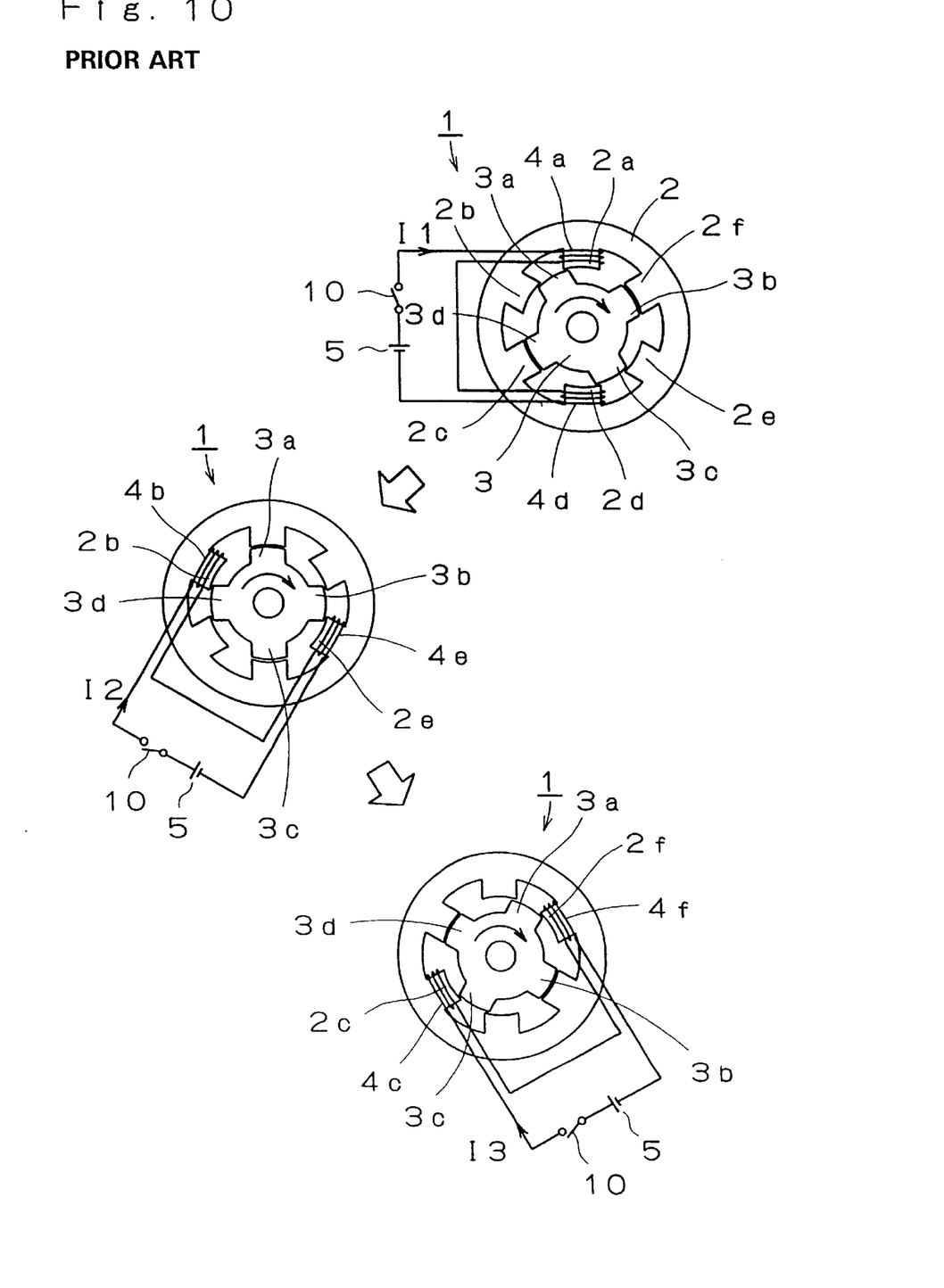
FIG. 10 shows the operational principle of an SR motor to which the present invention is applied.

The operational principle of SR motors in which the present invention is applied is explained in FIG. 10. As shown in FIG. 10, an SR motor 1 includes a hollow cylindrical stator 2 and a cylindrical rotor 3 which is rotatably provided in the stator 2 keeping a predetermined gap with the stator 2. On the inner periphery of the stator 2, six radial poles 2a–2f are formed at equal intervals. On the outer periphery of the rotor 3, four radial poles 3a–3d are formed at equal intervals. When two radial poles of the stator 2 (e.g., 2c, 2f) are opposed to two radial poles of the rotor 3 (e.g., 3b, 3d), two other radial poles 3a, 3c of the rotor 3 are located between radial poles of the stator 2, i.e., 2a, 2b, and 2d, 2e respectively. Each pair of opposing radial poles 2a and 2d, 2b and 2e, and 2c and 2f, shares a common circuit including coils 4a and 4d, 4b and 4e, and 4c and 4f respectively.

As shown in FIG. 10, when electric current I1 is supplied to the coils 4a, 4d, magnetic flux is generated in the poles 2a, 2d of the stator 2, and thus attracts the poles 3a, 3c of the rotor 3. As shown in FIG. 10, when the electric current I2 is supplied to the coils 4b, 4e, the magnetic flux is generated in the poles 2b, 2e of the stator 2, and thus attracts the poles 3d, 3b of the rotor 3. As shown in FIG. 10, when the electric current I3 is supplied to the coils 4c, 4f, the magnetic flux is generated in the poles 2c, 2f of the stator 2, and thus attracts the poles 3c, 3a of the rotor 3. Accordingly, by supplying three-phase electric current I1–I3 to the pairs of coils 4a–4c, 4b–4e and 4c–4f synchronous with the rotation of the rotor 3, the rotor 3 can be driven at a desired rotation number. By ON/OFF operation of a switching element 10, each electric current I1–I3 is switched ON and OFF. Each electric current is supplied by electric voltage from a battery 5.

Figure 11:
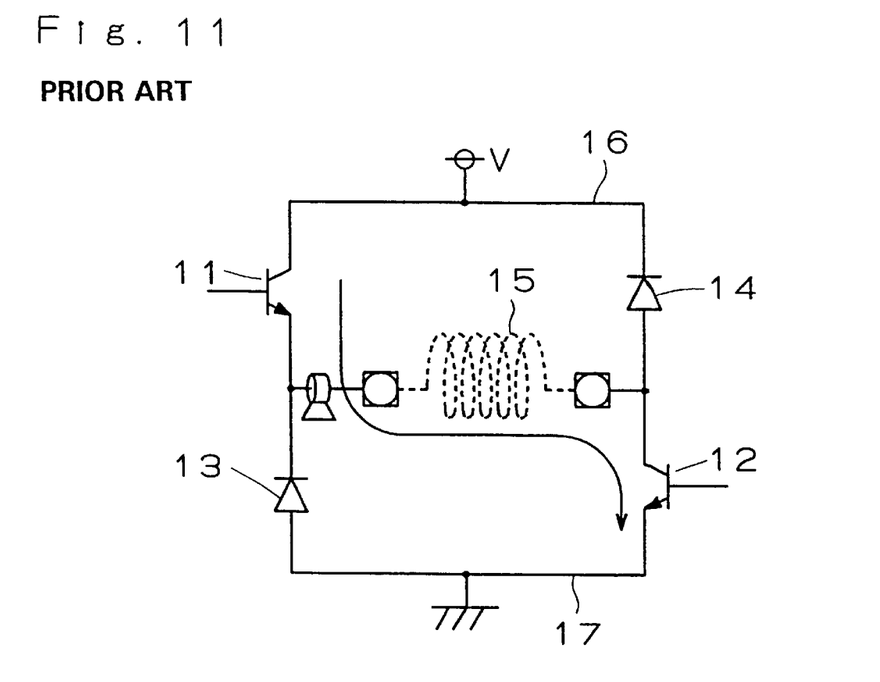
FIG. 11 shows a switching circuit for switching a coil of the SR motor.

FIG. 11 shows a switching circuit for energizing the coils of SR motor by chopping control shown in FIG. 10. The switching circuit illustrated is only for one phase. In order to drive the SR motor 1 shown in FIG. 10, three systems of the same switching circuit are provided.

In FIG. 11, the switching circuit includes a first switching element 11, a second switching element 12, a first diode 13, and a second diode 14. The first switching element 11 is connected between one end of a phase coil 15 and a high electric potential line 16 of a power source. The second switching element 12 is connected between the other end of the coil 15 and a low electric potential line 17 of a power source. The first diode 13 is connected between one end of the coil 15 and the lower electric potential line 17. The second diode is connected between the other end of the coil 15 and the high electric potential line 16.

The first diode 13 allows the electric current to flow from the low electric potential line 17 to one end of the coil 15. The second diode 14 allows the electric current to flow from the other end of the coil 15 to the high electric potential line 6. Both the first and the second diodes are flywheel diodes. A Japanese Patent Laid-Open Publication No. H07-274569 discloses a switching circuit of this kind. The switching elements 11, 12 may be, for instance, Insulated Gate Bipolar Transistors (IGBT).

There are five methods for chopping control of the SR motor 1 by the switching circuit, which are Soft Chopping, Hard Chopping, 0V Loop (zero-volt loop), DUTY Chopping, and Three-Step OFF. The Soft Chopping is a drive method for maintaining a target electric current value by switching ON/OFF only the first switching element 11 or the second switching element 12. In the Hard Chopping driving method, a target electric current value is maintained by switching ON/OFF both the first and the second switching elements 11, 12. The 0V Loop is a driving method for utilizing the energy by turning off the first switching element 11 and turning on the second switching element 12 during the condition that the electric current is already flowing. In the DUTY Chopping method, ON/OFF of the first switching element 11 is switched while the second switching element 12 is OFF, thus to utilize the electric current by degrees. The Three-step OFF is a driving method varying the operation from either one of Soft Chopping or Hard Chopping, 0V Loop, and to DUTY Chopping.

Figure 12:
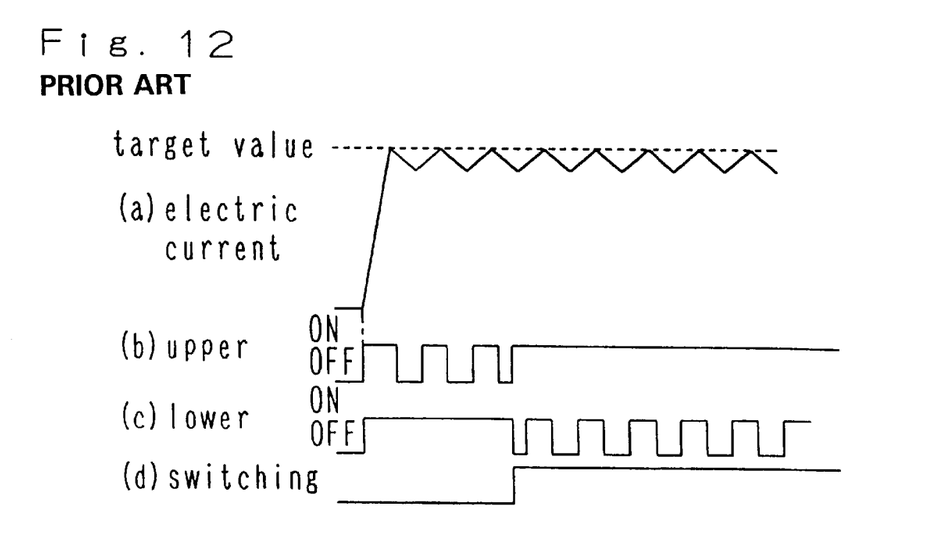
FIG. 12 shows wave form for explaining the operation of switching circuit of FIG. 11.

FIG. 12 shows a wave form of switching circuit operated by Soft chopping. An upper signal shown as (b) of FIG. 12 corresponds to a drive signal for actuating the switching element 11. A lower signal shown as (c) of FIG. 12 corresponds to a drive signal for driving the switching element 12. The upper signal which repeats switching ON/OFF shown in FIG. 12 is given to a base of the switching element 11. The lower signal which regularly maintains ON shown in FIG. 12 is given to a base of the switching element 12.

When both the upper signal and the lower signal are ON, the switching elements 11, 12 are conductive, and thus the electric current flows from the high electric potential line 16 to the low electric potential line 17 via the switching element 11, the coil 5, and the switching element 12. When the upper signal is switched to OFF, switching element 11 is disconnected. The lower signal maintains ON. In this condition, the second switching element 12 is conducted and the first diode 13 allows the electric current flow according to the accumulated energy in the coil 15b. The current flows from the coil 15 to the low electric potential line 17 via the second switching element 12. Then, when the upper signal is switched to be ON again, the switching element 11 is conductive, and thus the electric current flows from the switching element 11 to the switching element 12 via the coil 15.

By repeating the forgoing operation, electric current shown in FIG. 12 flows in the coil 15. In FIG. 12, rise of ripple is due to the rise of the electric current flowing in the coil 15 by conduction of the switching element 11. Drop of ripple is due to the moderate reduction of the energy accumulated in the coil 15 by disconnection of the switching element 11. The target value of the electric current is determined at a predetermined value in order to obtain a necessary torque in accordance with the driving condition, when the SR motor is applied, for instance, to the electric vehicle.

In the switching circuit shown in FIG. 11, the switching elements 11, 12 develop heat by energization. An IGBT used as the switching elements 11, 12 is destroyed when the temperature is greater than 150° C. Thus, a temperature sensor is positioned near the switching elements 11, 12 to restrict the electric current flowing in the coil 15 for preventing a further increase of the temperature when the temperature detected by the temperature sensor is increased, for example, to 120° C.–130° C.

On one hand, the upper signal explained in FIG. 12 repeats switching ON/OFF alternatively. On the other hand, the lower signal maintains ON condition. Thus, the switching element 11 repeats the switching ON/OFF and the switching element 12 is maintained to be ON. Accordingly, duration of ON period of the switching element 12 becomes longer than that of the switching element 11 and switching number of the switching element 11 becomes greater than that of the switching element 12. Hence, switching loss of the switching element 11 becomes greater, the temperature increase of the switching element, 11 becomes greater than that of the switching element 12, and the heat generation of each switching element becomes unbalanced.

In order to balance the temperature increase of the switching elements 11, 12, Japanese Patent Application Laid-Open Publication No. 2000-270591 by the applicant discloses a control method for switching elements 11, 12 to be ON alternatively by switching a period for maintaining ON of the upper signal and the lower signal at a predetermined time by a chopping switching signal shown in FIG. 12.

The chopping switching signal is switched at a predetermined time following the order from a CPU. In the aforementioned application, the condition maintaining ON and the condition repeating switching ON/OFF of the upper signal and the lower signal were switched immediately following the switching signal. In this condition, every time switching on the chopping side is performed, a loss is generated by one, and the accumulation of the loss thereof deteriorates the operational efficiency of the motor.

As shown in FIG. 12, according to the foregoing application, the time period for being ON/OFF of the upper signal and the lower signal is predetermined so that both the upper signal and the lower signal have a chopping operation for a predetermined time period. However, when the switching is performed only for the predetermined time period, irrespective of the predetermined time period, the level of both the upper signal and the lower signal is switched, and thus the number of ON/OFF is increased by one every time the switching is performed. For example, the lower side may perform ON/OFF ten times contrasted to nine times of ON/OFF at the upper side. This phenomenon is not favorable regarding the balance of heat development.

A need thus exists for an improved energization control system for a motor that obviates drawbacks associated with known energization control systems for a motor described above.

A need also exists for an energization control system for a motor for keeping the balance of heat development of the of two switching elements as equal as possible.

SUMMARY OF THE INVENTION

Accordingly, it is an object of the present invention to provide an improved energization control system for a motor which obviates the above drawbacks. It is another object of the present invention to provide an improved energization control system for a motor which can keep a balance of heat development between two switching elements as equal as possible.

To achieve the aforementioned objects the following technical means are provided for the energization control system of the motor of the present invention which includes a plurality of phase coils wound around a corresponding stator of the motor, a first switching element disposed between one end of one of the coils and one side of a power source line and a second switching element disposed between the other end of the coil and the other side of the power source line. The energization control system for the motor supplies an electric current from the power source line to the coil when the first switching element and the second switching element are simultaneously conducted. The first and second switching elements are controlled under a first condition that one of the first or the second switching elements is switched every first predetermined time while the other of the first or second switching elements is conductive. The first and second switching elements are controlled under a second condition that the other of the first or second switching elements is switched said every first predetermined time while said one of the first or second switching elements is conductive. The first condition and the second condition are repeated synchronized to said first predetermined time every predetermined period.

BRIEF DESCRIPTION OF THE DRAWING FIGURES

The foregoing and additional features and characteristics of the present invention will be more apparent from the following detailed description considered with reference to the accompanying drawing figures in which like reference numerals designate like elements and wherein.

DETAILED DESCRIPTION OF THE INVENTION

Figure 1:
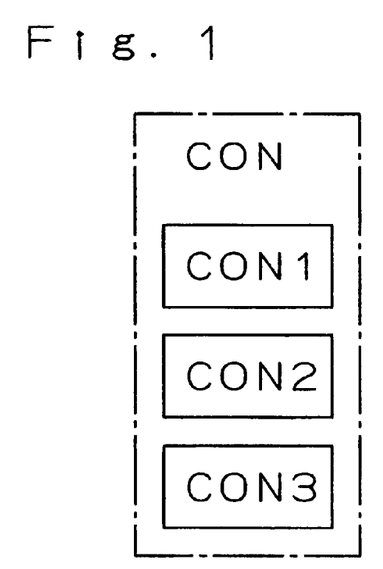
FIG. 1 is a block diagram of an energization control system for a three-phase switched reluctance motor.

With reference to FIG. 1, a schematic view of an energization control system CON for a three-phase SR motor 1 (FIG. 10) carried on an electric vehicle as a driving means is shown. The energization control system CON includes a first control unit CON1, a second control unit CON2, and a third control unit CON3 which serve for controlling a first phase coil, a second phase coil, and a third phase coil respectively. The three-phase SR motor has twelve stator magnetic poles and eight rotor magnetic poles.

The first control unit CON1, the second control unit CON2, and the third control unit CON3 are of substantially the same structure.

Figure 2:
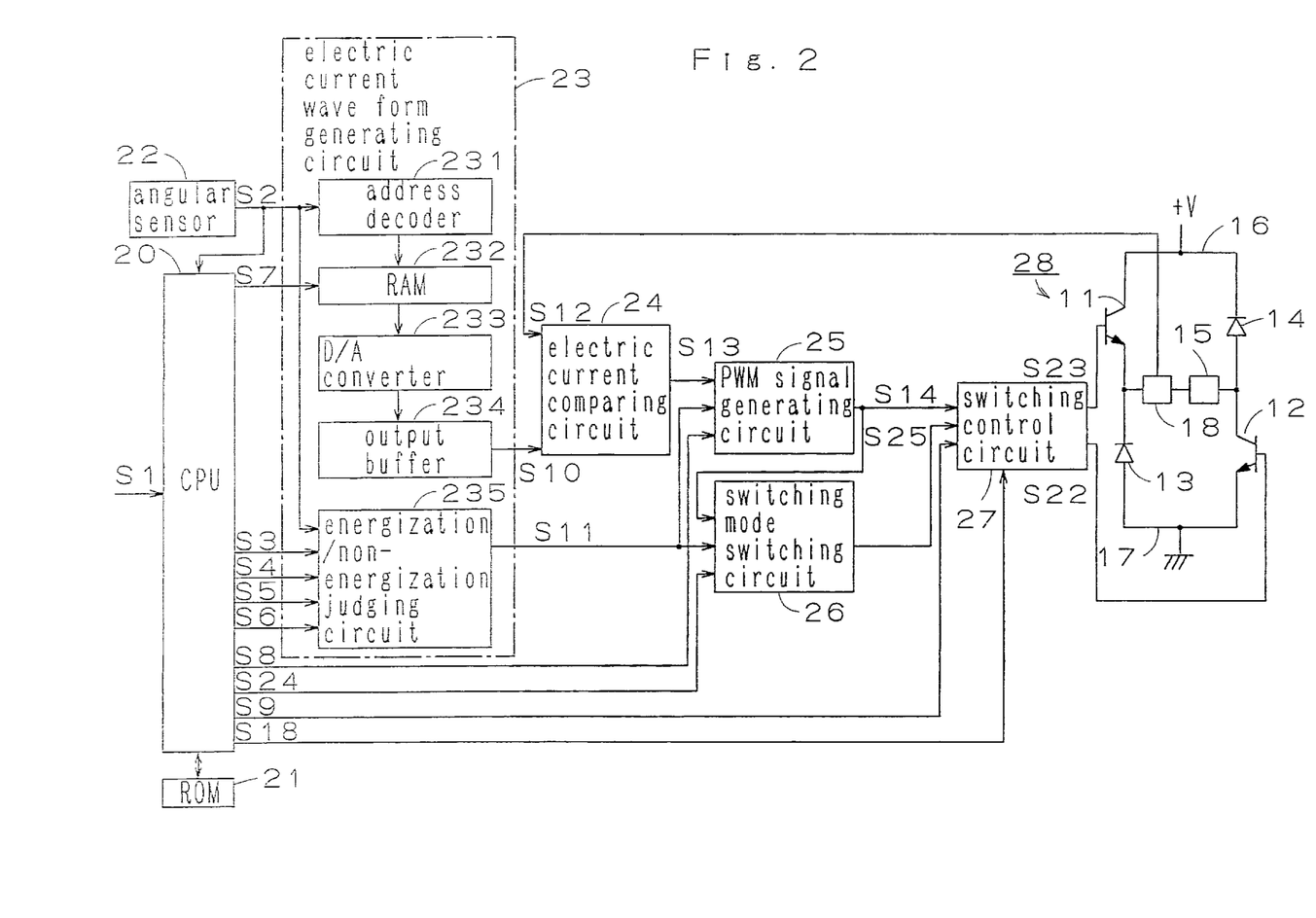
FIG. 2 is a schematic view of a first embodiment of an energization control system according to the present invention.

Referring initially to FIG. 2, which illustrates a schematic view of a first embodiment of the one of the control units CON1, CON2, or CON3 of the present invention wherein actuation of a switching circuit 28 switching one-phase coil 15 of the SR motor explained in FIG. 11 is shown. When the SR motor includes three phases, three units of the same circuit are provided in accordance with each phase.

The energization control system includes a CPU 20, a ROM 21, an angular sensor 22, an electric current wave form generating circuit 23, an electric current comparing circuit 24, a PWM signal generating circuit 25, a switching mode switching circuit 26, a switching control circuit 27, and a switching circuit 28. The angular sensor 22 detects the angle of the rotor of the SR motor. The detected rotor angle is given to the CPU 20, an address decoder 231 in the electric current wave form generating circuit 23, and an energization/non-energization judging circuit 235 by a digital signal S2.

The ROM 21 memorizes various data regarding the energization control of a first phase. That is, the ROM 21 memorizes the predetermined plural pairs of energization starting angle data and energization ending angle data in accordance with a combination of rotation number of the SR motor including positive rotational number and negative rotational number and a torque including positive torque and negative torque, a plurality of electric current wave form data (i.e., data showing a standardized electric current value supposed to be flowing in the first phase coil 15 by a rotor angle detected by the angular sensor 22), and a plurality of PWM duty data.

The CPU 20 outputs a reset pulse signal S3 to the energization/non-energization judging circuit 235 in the electric wave form generating circuit 23 in response to the switching of a main switch (not shown) which is closed during the driving of the electric vehicle from open to closed. The CPU 20 also outputs a binary signal S4 judging existence of abnormality and showing whether there is abnormality to the energization/non-energization judging circuit 235. When the binary signal S4 is high level, there is no abnormality, and low binary signal S4 shows that there is an abnormality.

When it is judged that there is no abnormality, the following is performed by the CPU 20. The rotational number of the SR motor is successively calculated based on the digital signal S2 from the angular sensor 22. The target torque of the SR motor is successively calculated based on information S1 inputted from a shift lever, a brake switch, an accelerator switch, and an accelerator rotation sensor. A pair of energization starting angle and energization ending angle, one electric wave form, and one PWM duty in accordance with the calculated rotational number and the torque are read out from the ROM 21. Thus, the read out of a pair of energization starting angle and the energization ending angle is outputted to the energization/non-energization judging circuit 235 of the electric current wave form generating circuit 23 as a digital signal S5 and a digital signal S6.

The CPU 20 further outputs the read out electric current wave form to a RAM 232 in the electric current wave form generating circuit as a digital signal S7. Furthermore, the CPU outputs the read out PWM duty to the PWM signal generating circuit 25 as a digital signal S8, judges whether performing regeneration from the direction of the rotational number (whether positive or negative) and the direction of targeted torque, and outputs binary signal S24 showing whether performing regeneration to the switching mode switching circuit 26. Low signal S24 corresponds to regeneration is performed and High signal S24 corresponds to regeneration is not performed.

The CPU 20 performs a switching element switching transaction, and outputs binary signal S9 in accordance with the result of the transaction to the switching control circuit 27. The switching control circuit 27 switches a signal transmitting route between the switching mode switching circuit 26 and first and second switching elements 11 and 12 for driving the first phase coil 15. The CPU 20 gives a chopping clock signal S18 to the switching control circuit 27.

Figure 3:
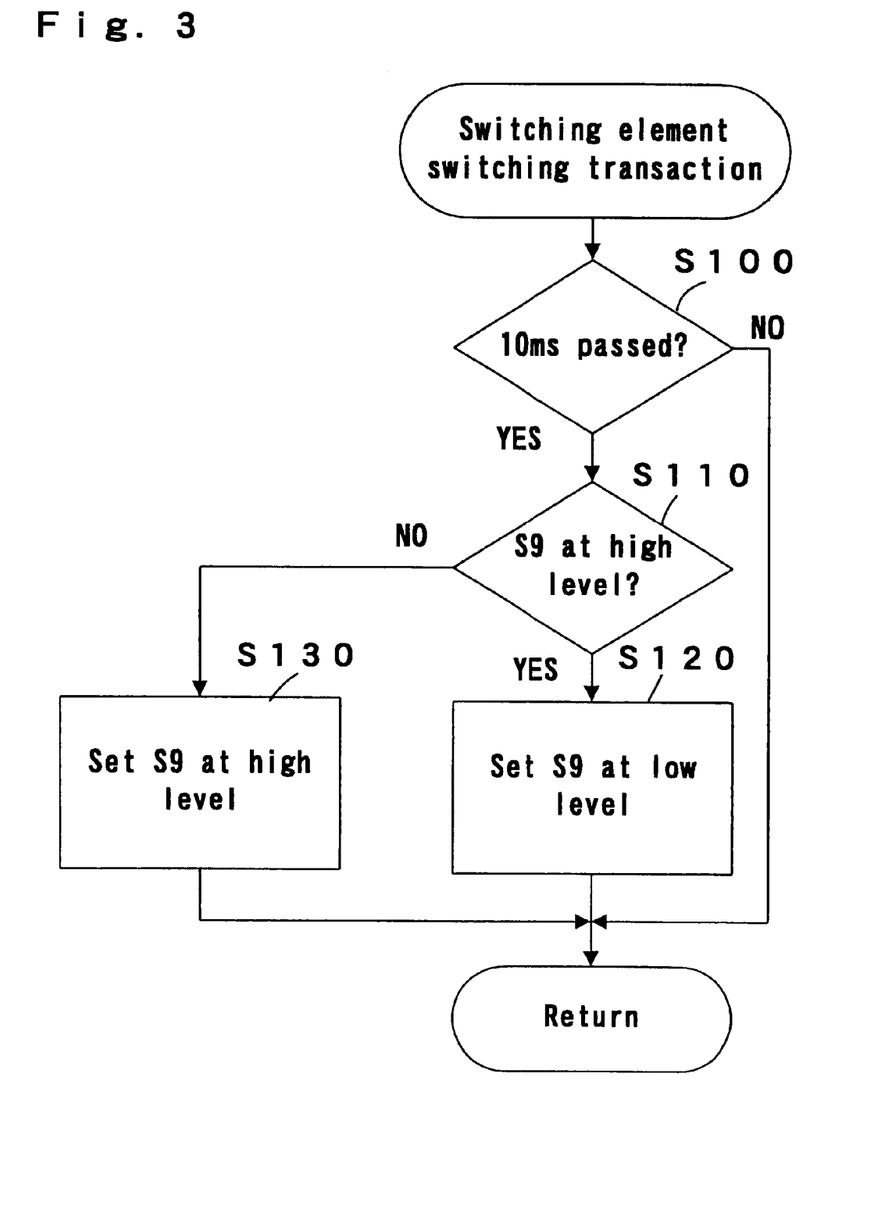
FIG. 3 is a flowchart of the routine used for a switching element switching transaction by the energization control system of FIG. 2.

FIG. 3 is a flow chart showing the switching element switching transaction. At a step S100 shown in FIG. 3, it is judged whether 10 msec has passed by the CPU 20. When 10 msec has passed, it is judged whether the signal S9 is at high level in step S110. When 10 msec has not passed, the signal S9 is set at high level in step S130. When the signal S9 is at high level, the signal S9 is set at low level in step S120. Accordingly, the level of the signal S9 is switched every 10 msec.

Referring to FIG. 2, the electric current wave form inputted into the RAM 232 of the electric current wave form generating circuit 23 as the digital signal 7 from the CPU 20, i.e., a standardized electric current value data in accordance with the rotor angle, is stored in the address in accordance with the rotor angle of the RAM 232. The angle inputted into the address decoder 231 in the electric current wave form generating circuit 23 as the digital signal S2 from the angular sensor 22 is transformed into an address of RAM 232. The electric current wave form generating circuit 23 reads out the standardized electric current value in accordance with the angle from the RAM 232 every time when the detected angle by the angular sensor 22 is varied, transforms the standardized electric current value from the digital signal to an analogue signal by a D/A converter 233, and outputs the analogue signal as an analogue signal S10 from an output buffer 234 to the electric current comparing circuit 24.

The energization/non-energization judging circuit 235 in the electric current wave form generating circuit 23 generates a binary signal S11 showing the energization/non-energization of the first phase coil 15 based on the signal S3–S6 inputted from the CPU 20 and the signal S2 inputted from the angular sensor 22. The binary signal S11 is outputted to the PWM signal generating circuit 25 and the switching mode switching circuit 26. High level binary signal S11 corresponds to energization and low level sbinary signal S11 corresponds to non-energization. When the signal S4 is low level (showing the existence of abnormality), the signal S11 is maintained at low level. When the signal S4 is high level, the signal S11 is set at low level tentatively by the input of the reset pulse signal S3. Then, the signal S11 is switched from low level to high level when the rotor angle shown by the signal S2 reaches the energization starting angle shown by the signal S5. When the rotor angle shown by the signal S2 reaches the energization ending angle shown by the signal S6, the signal S11 is switched from high level to low level.

The PWM signal generation circuit 25 generates a PWM signal (binary signal) S14 which is outputted to the switching control circuit 27. The switching mode switching circuit 26 generates binary signal S25 which is outputted to the switching control circuit 27. The switching control circuit 27 generates binary signal S23 which is outputted to the switching circuit 28. The switching circuit 28 includes a first switching element 11 disposed between one end of a first phase coil 15 and a high electric potential line 16 from a direct current power source, a second switching element 12 disposed between the other end of the first phase coil 15 and a low electric potential line 17 from the direct current power source, a first diode 13 disposed between one end of the first phase coil 15 and the low electric potential line 17, and a second diode 14 disposed between the other end of the first phase coil 15 and the high electric potential line 16. An electric current sensor 18 for detecting the actual electric current value actually flowing in the first phase coil 15 is disposed between one end of the first phase coil 15 and the first switching element 11 and the first diode 13. The electric current sensor 18 outputs the electric current value actually flowing in the first phase coil 15 to the electric current comparing circuit 24 as an analogue signal S12.

The electric current comparing circuit 24 compares the analogue signal S10 showing the standardized electric current value supposed to be flowing in the first phase coil 15 and an analogue signal S12 showing the actual electric current value and then outputs binary signal S13 showing whether the electric current value actually flowing in the first phase coil 15 is smaller than the standardized electric current value to the PWM signal generating circuit 25. High level binary signal S13 shows that the electric current value actually flowing in the first phase coil 15 is smaller than the standardized electric current value. Low level shows that the electric current value actually flowing in the first phase coil 15 is greater than the standardized electric current value.

Figure 4:
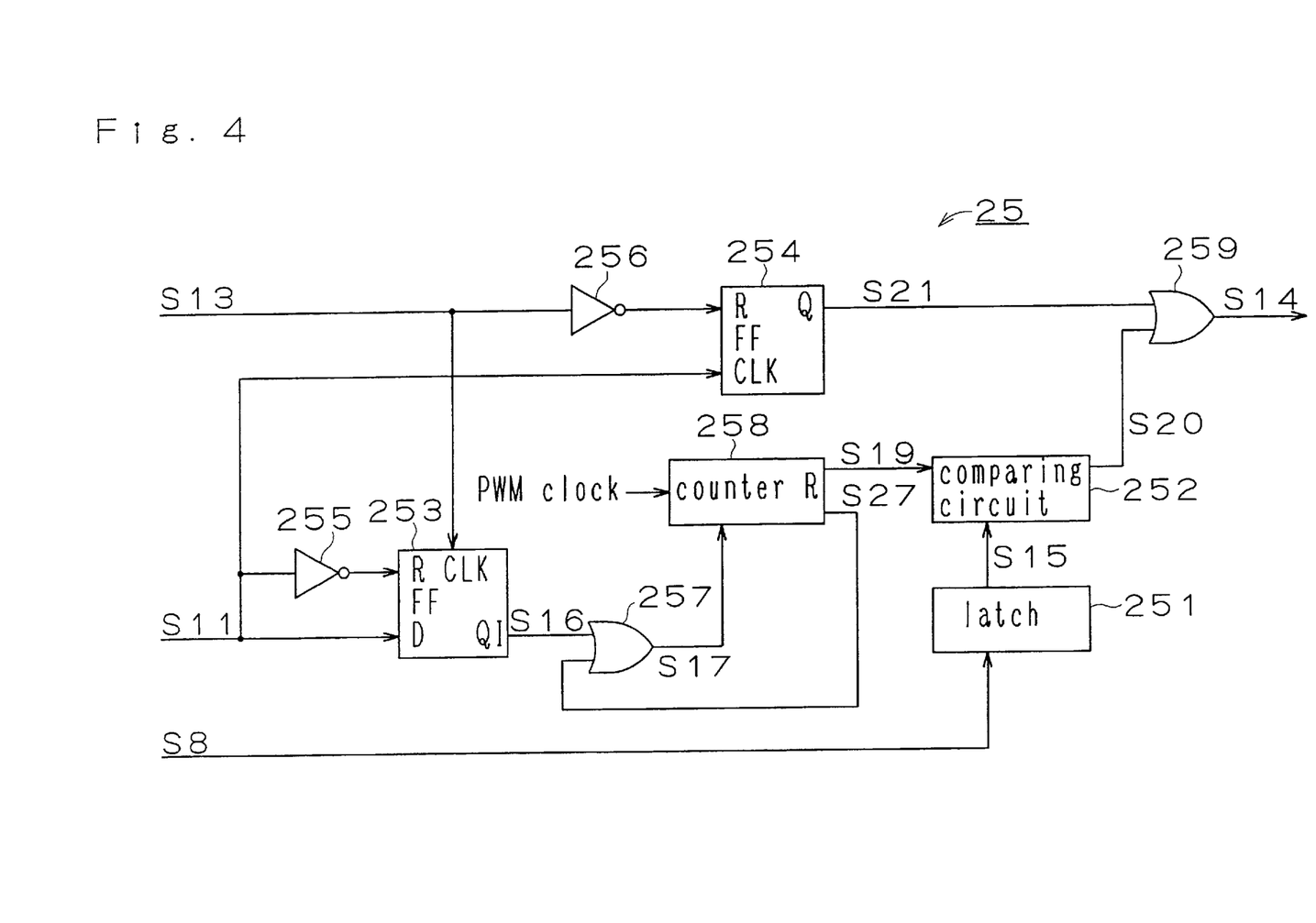
FIG. 4 is a detailed circuit diagram of a PWM signal generating circuit of FIG. 2.

FIG. 4 is a detailed circuit of the PWM signal generating circuit 25 shown in FIG. 2. In FIG. 4, the digital signal S8 (showing PWM duty) outputted from the CPU 20 is latched as a twelve bit digital signal S15 by a latch 251 and given to a comparing circuit 252. The binary signal S11 outputted from the energization/non-energization judging circuit 235 is inputted into a D input terminal of a flip-flop 253 and a clock input terminal CLK of a flip-flop 254. The binary signal S11 is further inverted in an inverter 255 to be inputted into a reset input terminal R of the flip-flop 253. The binary signal S13 outputted from the electric current comparing circuit 24 is given to the clock input terminal CLK of the flip-flop 253, inverted in an inverter 256, and inputted into the reset terminal R of the flip-flop 254.

A binary signal S16 outputted from an inverted output terminal Q1 of the flip-flop 253 is inputted into one of input terminals of an OR gate 257. A binary signal S17 outputted from the OR gate 257 is inputted into a reset input terminal R of a twelve bit counter 258. An overflow signal (binary signal) S27 of the twelve bit counter 258 is inputted into the other input terminal of the OR gate 257. The twelve bit counter 258 counts PWM clock signal, a twelve bit digital signal S19 showing the counted value thereof is inputted into the comparing circuit 252.

The comparing circuit 252 compares the inputted signals S15 and S19, and outputs a binary signal S20. When the signal S19 is smaller than S15, the signal S20 becomes low level. When the signal S19 is equal to the signal S15 or when the signal S19 is greater than the signal S15, the signal S20 becomes high level.

The binary signal S20 outputted from the comparing circuit 252 is inputted into one of input terminals of an OR gate 259. A binary signal S21 outputted from an output terminal Q of the flip-flop 254 is inputted into the other input terminal of the OR gate 259. An output from the OR gate 259 becomes the PWM signal S14. A constant electric voltage is applied to a D input terminal of the flip-flop 254.

In the PWM signal generating circuit 25 structured in the foregoing manner, the output signal S21 of the flip-flop 254 is switched from low level to high level by the energization starting order by which the binary signal S11 is switched from low level to high level. Thus, the PWM signal S14 outputted from the OR gate 259 is switched from low level to high level. The binary signal S13 is switched from low level to high level synchronizing to the switching of the binary signal S11 from low level to high level. This is caused because the signal S10 showing the standardized electric current value to the coil 15 becomes greater than the signal S12 showing the actual electric current value. When the binary signal S13 is switched from high level to low level, i.e., when the actual electric current value reaches the standardized electric current value, the flip-flop 254 is reset, and thus the signal S21 is switched from high level to low level. Accordingly, during the time period from the energization start until the actual electric current value reaches the standardized electric current, the PWM signal S14 is maintained at high level.

By switching the signal S11 from low level to high level, the output signal S16 of the flip-flop 253 becomes high level, the signal S17 becomes high level thus to stop the counting operation of the twelve bit counter 258, the signal S19 shows zero, and the overflow signal S27 becomes low level. Since the signals S27 usually indicates PWM duty greater than zero, the signal S19 becomes smaller than S15 and thus the output signal S20 of the comparing circuit 252 becomes low level.

When the signal S13 is switched from low level to high level after the signal S11 is switched from low level to high level, i.e., when the actual electric current value of the coil 15 becomes below the standardized electric current value again after reaching the standardized electric current value, the output signal S16 of the flip-flop 253 is switched from high level to low level, the signal S17 is switched from high level to low level, the twelve bit counter 258 starts counting the PWM clock signal, and thus the value of the signal S19 successively increases.

When the value of signal S19 becomes greater than that of the signal S15, the signal S20 is switched from low level to high level. Then, when the twelve bit counter 258 overflows, the signal S27 is switched from low level to high level and the signal S17 is switched from low level to high level.

Thus, the twelve bit counter 258 is reset, the signal S19 indicates zero, and the signal S20 is switched from high level to low level. By the twelve bit counter 258 being reset, the signal S27 is switched to low level again, and thus the twelve bit counter 258 restarts counting the PWM clock signal.

As foregoing, the signal S20 repeats switching the low level and the high level alternatively. The sum of time period t1 of the low level and time period t2 of high level keeps constant value and the value of t2/(t1+t2) becomes PWM signal which corresponds to the PWM duty value indicated by the signal S8. In this embodiment, the sum of t1 and t2 is set to be 66 μsec (t1+t2=66 μsec). Since the signal S21 is at low level at the point when the signal S20 starts repeating the switching of low level and high level alternatively, the signal S14 becomes a PWM signal corresponding to the signal S20.

Then, due to the energization ending order to the coil 15 by which the signal S11 is switched from high level to low level and the switching of the output signal S16 of the flip-flop 253 from low level to high level, the signal S17 becomes high level. Thus, the counting operation of the twelve bit counter 258 is stopped, the signal S19 is maintained at the condition indicating zero, the signal S20 is maintained at low level, and the signal S14 is maintained at low level.

Figure 5:
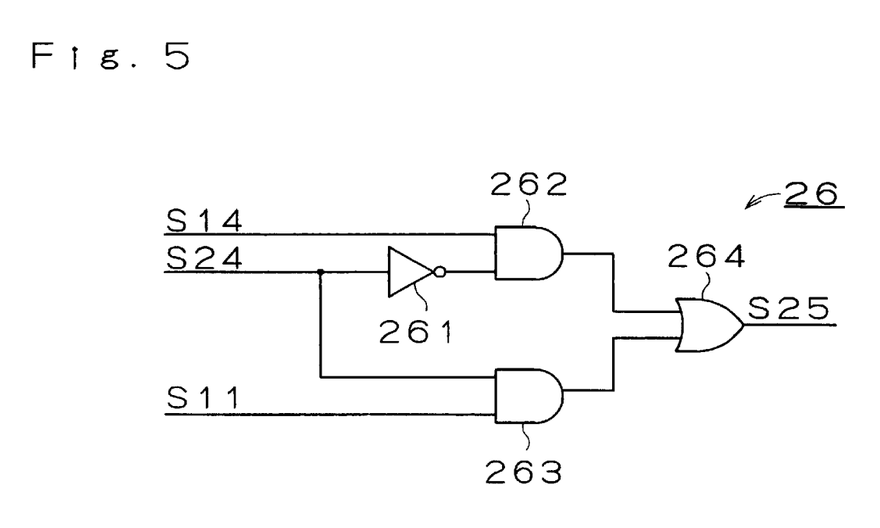
FIG. 5 is a detailed circuit diagram of a switching mode switching circuit of FIG. 2.

FIG. 5 shows details of the switching mode switching circuit 26. In FIG. 5, the switching mode switching circuit 26 includes an inverter 261, first and second AND gates 262, 263, and an OR gate 264. The signal S24 outputted from the CPU 20 is given to one of the input terminals of the second AND gate 263 and at the same time the signal S24 is inverted in the inverter 261 to be inputted into one of input terminals of the first AND gate 262. The output signal S14 of the PWM signal generating circuit 25 is inputted into the other input terminal of the first AND gate 262. The signal S11 outputted from the energization/non-energization judging circuit 235 is inputted into the other input terminal of the second AND gate 263. Each output from the first and the second AND gate 262, 263 is inputted into two input terminals of the OR gate 264. The output signal S25 of the OR gate 264 is inputted into the switching control circuit 27.

As shown in FIG. 5, the switching mode switching circuit 26 outputs the signal S11 which the energization/non-energization judging circuit 235 outputs as the signal S25, when the signal S24 is at low level (i.e., when the regeneration operation is made). When the signal S24 is at high level (i.e., when the regeneration operation is not made), the switching mode switching circuit 26 outputs the signal S11 which the energization/non-energization judging circuit 235 outputs as the signal S25.

Figure 6:
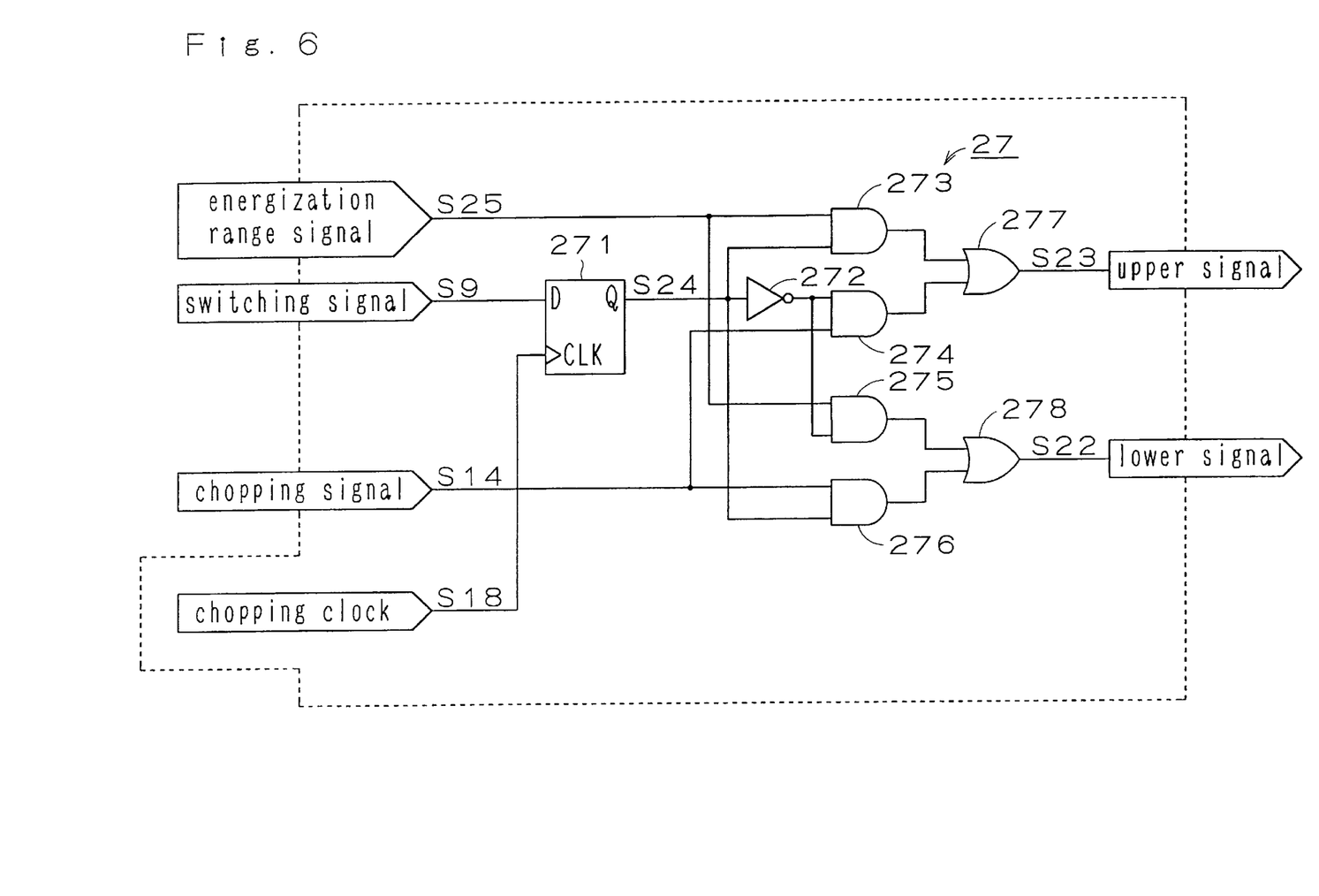
FIG. 6 shows further details of the embodiment of the switching control circuit of FIG. 2.

FIG. 6 shows details of the switching control circuit 27 shown in FIG. 2. As shown in FIG. 6, the switching control circuit 27 includes a flip-flop 271, an inverter 272, third, fourth, fifth, and sixth AND gate 273, 274, 275, 276, and second and third OR gate 277, 278. The switching signal S9 from the CPU 20 is given to the D input terminal of the flip-flop 271. The chopping clock signal S18 from CPU 20 is given to a clock input terminal CLK of the flip-flop 271. The output signal S24 from the Q output terminal of the flip-flop 271 is given to one of the input terminals of the third and the sixth AND gates 273, 276 respectively, is inverted in the inverter 272, on of the input terminals and is given to the other ends of the fourth and the fifth AND gates 274, 275. The signal S25 showing the energization range is given to the other input terminals of the third and the fifth AND gates 273, 275 respectively from the switching mode switching circuit 26. The chopping signal S14 is inputted into the other input terminals of the fourth and the sixth AND gates 274, 276 from the PWM signal generating circuit 25. Each output signal of the third and the fourth AND gate is given to two input terminals of the second OR gate 277. The output signal S23 of the second OR gate 277 is given to the base of the switching element 11 as the upper signal. Each output signal of the AND gates 275, 276 is given to two input terminals of the third OR gate 278. An output signal S22 of the third OR gate 278 is given to the base of the switching element 12 as the lower signal.

Figure 7:
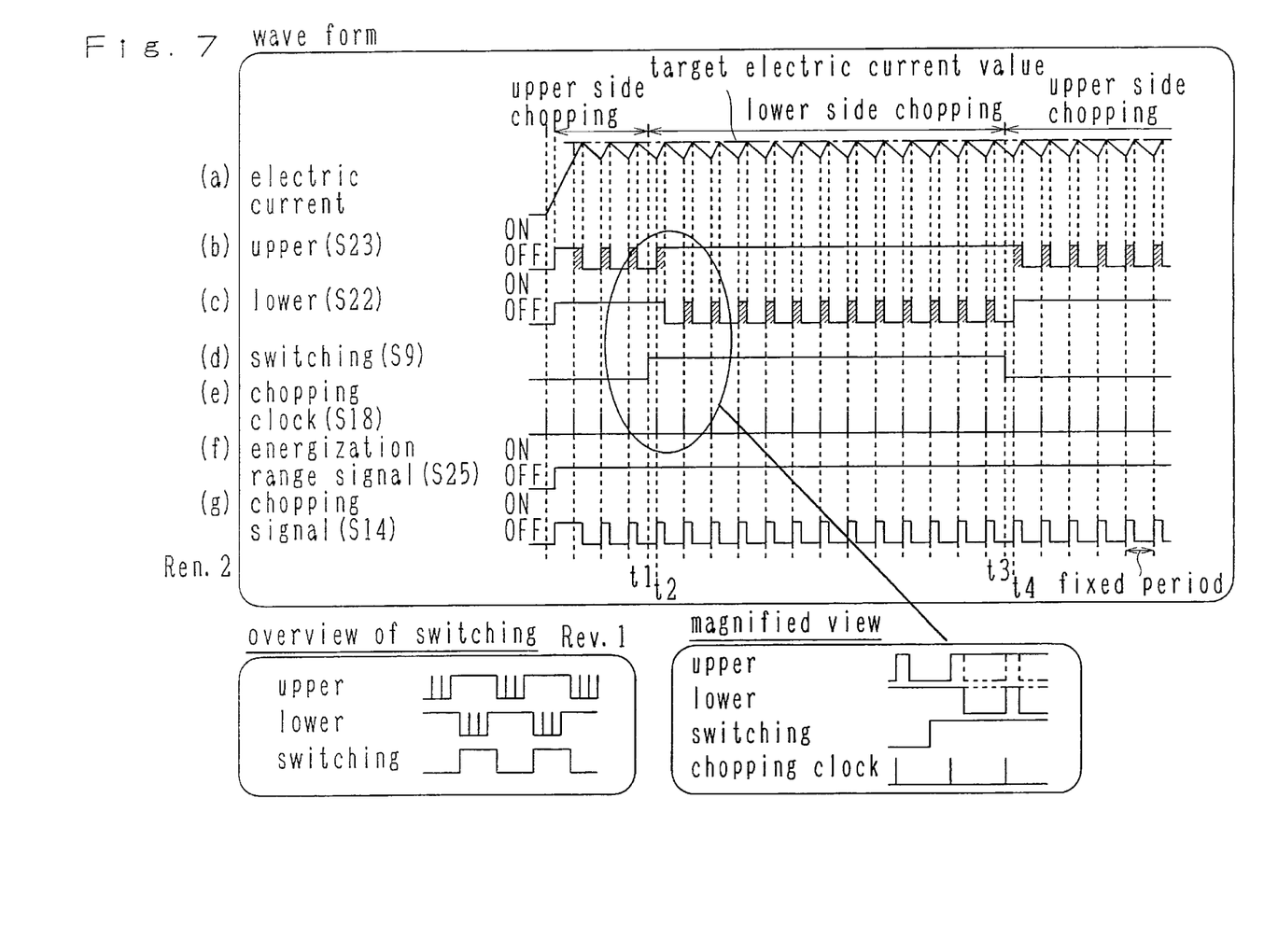
FIG. 7 is a time chart used for explaining the operation of the switching control circuit of FIG. 6.

FIG. 7 is a time chart illustrating the operation of the switching control circuit 27 and the switching circuit 28.

The switching signal (d) of FIG. 7 shows that the upper signal repeats high level and low level conditions alternatively and the lower signal maintains high level during low level of the switching signal. On the contrary, the upper signal maintains high level and the lower signal repeats the switching of high level and low level conditions alternatively during the high level of the switching signal.

The chopping signal S14(g) shown in FIG. 7 becomes high level synchronizing to the rise of the energization range signal to high level. The chopping signal S14 becomes high level only during ON period when either one of the switching elements 11, 12 is ON and the other of the switching elements 11, 12 is switching ON/OFF. The chopping signal S14 shows the period that actual electric current is flowing in the coil 15 by turning ON the other of the switching elements 12, 11. In other words, the period in which the electric current flows in the coil 15 by the stored energy in the coil 15 while the other switching element is OFF is shown when the chopping signal is at low level.

In FIG. 6, the switching signal S9 shown at (d) in FIG. 7 is given to the D input terminal of the flip-flop 271 from the CPU. The signal S18 from CPU 20 which is given to clock input terminal CLK of a flip-flop 271 is the chopping clock signal (e) of FIG. 7 from CPU 20. Thus, when the switching signal rises to high level at time t1, the switching signal is set at a time of rise of the chopping clock, and the signal S24 from Q output terminal rises to high level. The signal S24 is given to one of input terminals of the respective AND gates 273, 276. The energization range signal S25 of high level shown at (f) in FIG. 7 is given to the other input terminals of the third AND gate 273. The chopping signal (g) of FIG. 7 is given to the other input terminal of the AND gate 276. Accordingly, the AND gate 273 gives the upper signal S23 rising to high level (b) of FIG. 7 to the base of the switching element 11.

On the other hand, since the signal S24 is at high level, the chopping signal shown at (g) in FIG. 7 is outputted to the AND gate 276. The lower signal shown at (c) in FIG. 7 is outputted to the AND gate 276. As a result, the upper signal rises to a high level at the time that the chopping signal rises to high level synchronizing to the chopping clock but not at the time that the switching signal rises to high level. The lower signal becomes low level when the electric current flowing in the coil 15 reaches a targeted electric current value shown at (a) in FIG. 7. The lower signal which has been keeping high level becomes low only the time during the chopping signal being at high level. In this case, respective gates of the AND gates 274, 275 are closed since the signal S24 is inverted in the inverter 272 and becomes low level.

When the switching signal shown at (d) in FIG. 7 is switched to low level at time t3, the flip-flop 271 switches the signal S24 of Q output to low level at time t4 in which the chopping clock signal is inputted after the switching signal S9 becomes low level. Following low level signal, AND gates 273, 272 are closed and the signal S24 of low level is inverted by the inverter 272. Thus, the AND gate 274 outputs the chopping signal as the upper signal S23 and the AND gate 275 outputs lower signal S22 of high level since the energization range signal is at high level.

Accordingly, even when the switching signal is switched to low level, the upper signal S23 drops at time of drop of the chopping signal and the lower signal S22 rises at time of the rise of the chopping signal.

In the switching circuit 28, the switching element 11 is ON when the upper signal S23 is at high level and the switching element 11 is OFF when the upper signal S23 is at low level. Likewise, the switching element 12 is ON when the lower signal S22 is at high level, and is OFF when the lower signal S22 is at low level. As a result, the electric current is flowing in the coil 15.

Time period shown as hatched area of the upper signal and lower signal shown at (b) and (c) in FIG. 7 shows that the electric current is flowing in the corresponding switching element.

According to the foregoing first embodiment, even when the level of the switching signal S9 is switched, the switching of the upper signal and the lower signal does not follow the switching of the switching signal S9. The upper signal and the lower signal are synchronized to the chopping clock signal to switch the pattern of wave form that one of them repeats switching of high level and low level conditions alternatively while the other of them maintains high level. Accordingly, the frequency of the switching of the switching elements 11, 12 can be equal and thus maintain the balance of heat development.

Figure 8:
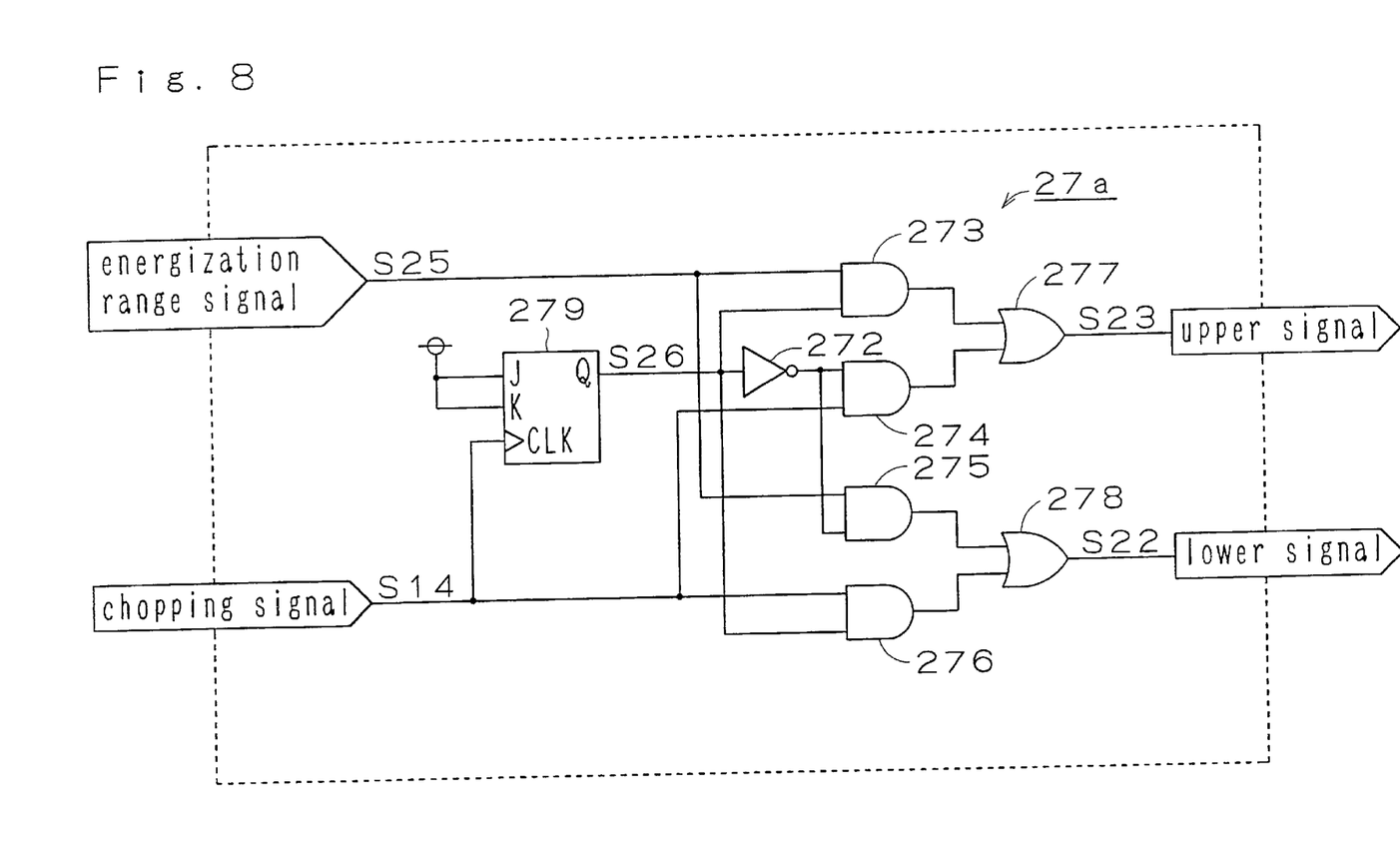
FIG. 8 shows a second embodiment of the switching control circuit of FIG. 2.

FIG. 8 shows details of the switching control circuit of a second embodiment of the present invention. In the first embodiment shown in FIG. 6, the wave form of the upper signal and the lower signal is switched being synchronized to the chopping clock signal. On the other hand, in the second embodiment shown in FIG. 8, the wave form of the upper signal and the lower signal is switched being synchronized to the chopping signal. Accordingly, in the second embodiment, as shown in FIG. 8, a JK flip-flop 279 is used instead of the D type flip-flop of the first embodiment shown in FIG. 6. Other components such as the inverter 272, the AND gates 273, 274, 276, and the OR gates 277, 278 are structured the same as shown in FIG. 6. In the second embodiment, only the energization range signal S25 and the chopping signal S14 are utilized and the switching signal S9 and the chopping clock S18 are not used.

Figure 9:
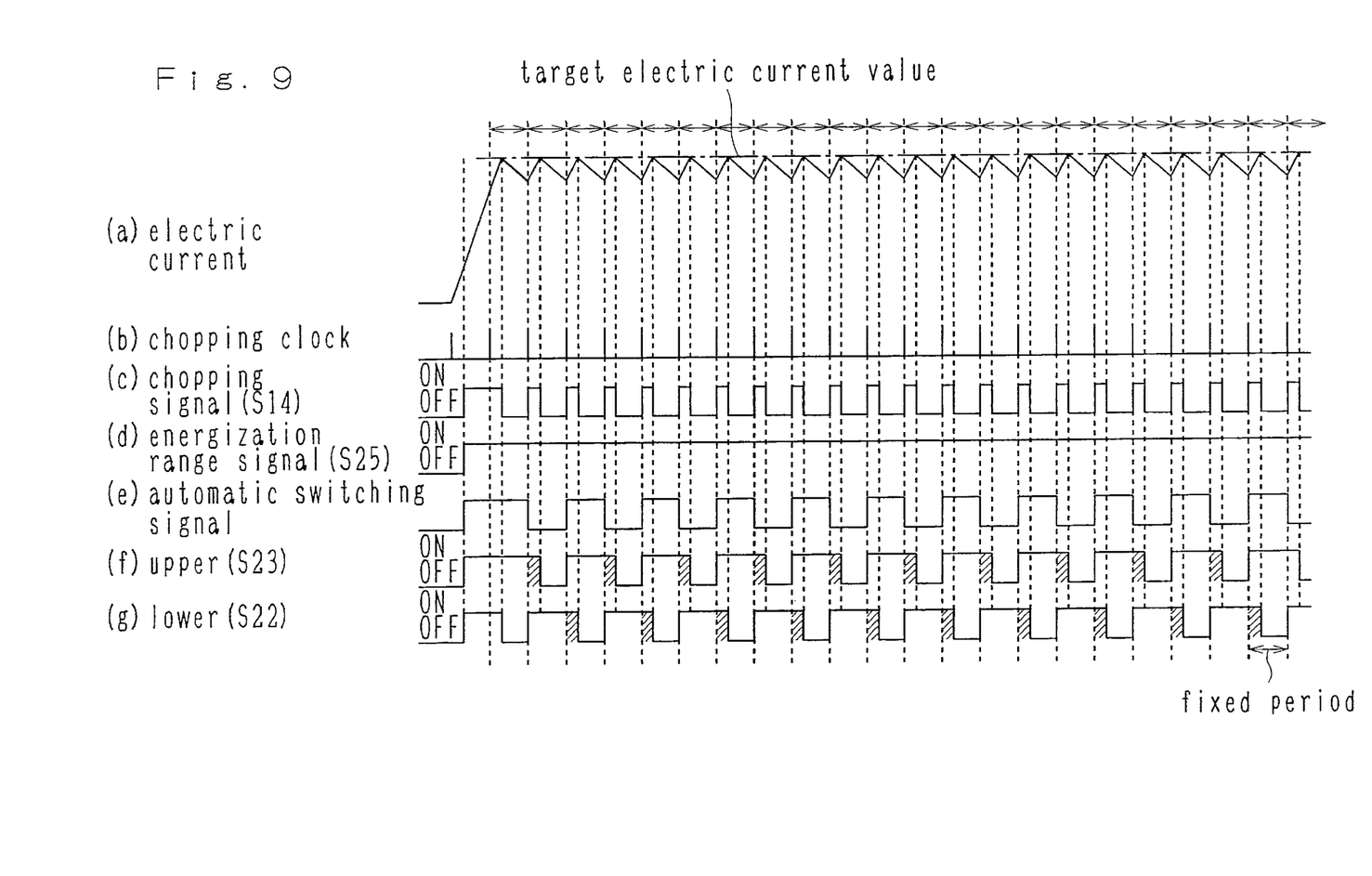
FIG. 9 is a time chart for explaining the operation of the switching control circuit of FIG. 8.

FIG. 9 is a time chart showing the operation of the switching control circuit 27a shown in FIG. 8.

A J input and a K input of the flip-flop 279 are connected to a high electric potential line and the chopping signal S14 is given to a clock input terminal CLK of the flip-flop 279. Accordingly, the flip-flop 279 inverts the output every time the chopping signal (c) shown in FIG. 9 is switched from low level to high level. The flip-flop 279 raises the signal S26 from output Q to high level at the first rise of the chopping signal. The signal S26 is given to the AND gates 273, 276 respectively. The AND gates 273, 274 output a signal to the OR gate 277. The OR gate 277 outputs a high level signal shown at (d) in FIG. 9 as upper signal S23. The AND gate 276 outputs the chopping signal as the lower signal S22 via the OR gate 278 since the signal 26 is at high level. Consequently, the upper signal S23 maintains high level as shown at (f) in FIG. 9. The lower signal S22 repeats switching of high level and low level conditions alternatively while the upper signal S23 maintains high level as shown at (g) in FIG. 9.

The flip-flip 279 inverts the signal S26 of the Q output to low level at a second rise of the chopping signal. When the signal S26 becomes low level, the signal S26 is inverted at the inverter 272, the AND gate 274 outputs the chopping signal as the upper signal S23, and the AND gate 275 outputs the energization range signal as the lower signal S22. As a result, the lower signal S22 rises from low level to high level synchronizing to the rise of the chopping signal. The upper signal drops from high level to low level synchronizing to the drop of the chopping signal. By repeating the foregoing series of operation, the upper signal and the lower signal are switched in synchronization with the rise of the chopping signal when rising from low level to high level and switched in synchronization with the drop of the chopping signal when dropping from high level to low level. The wave form of the upper signal and the lower signal can be switched every predetermined period.

Although the flip-flop 271 is switched by the switching signal S9 in the first embodiment shown in FIG. 6, the JK flip-flop 279 is used in the second embodiment shown in FIG. 8. Accordingly, the switching signal S9 receiving the order from the CPU 20 is not necessary and the decision on the chopping side can be automatically performed. Hence, the switching of the chopping side can be performed every time performing the chopping and thus the efficient energization can be performed.

In signals (f), (g) shown in FIG. 9, hatched area of the upper signal and the lower signal shows a period that the electric current flows in the corresponding switching element.

Although the embodiments of the present invention are explained for Soft Chopping, the energization control system for an SR motor of the present invention can be applied to other chopping control methods.

The principles, preferred embodiment and mode of operation of the present invention have been described in the foregoing specification. However, the invention which is intended to be protected is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes, and equivalents which fall within the spirit and scope of the present invention as defined in the claims, be embraced thereby.

What is claimed is:

1. An energization control system for a motor comprising:
   a plurality of phase coil wound around a corresponding stator of the motor; a first switching element disposed between one end of one of the coils and one side of a power source line;
   a second switching element disposed between the other end of the coil and the other side of the power source line; wherein
   the energization control system for a motor supplies an electric current from the power source line to the coil when the first switching element and the second switching element are simultaneously conducted,
   the first and second switching elements are controlled under a first condition that one of the first or the second switching elements is switched every first predetermined time while the other of the first or second switching elements is conducted,
   the first and second switching elements are controlled under a second condition that the other of the first or second switching elements is switched every first predetermined time while said one of the first or second switching elements is conducted, and
   wherein the first condition and the second condition are repeated synchronized to said first predetermined time every predetermined period.

2. The energization control system of the motor according to claim 1, wherein the first condition and the second condition are switched again after passing a second predetermined time which time interval is shorter than that of the first predetermined time.

3. The energization control system of the motor according to claim 1, wherein the first condition and the second condition are repeated synchronized to a first of said first predetermined time after the predetermined period has passed.

4. The energization control system of the motor according to claim 2, wherein the first condition and the second condition are repeated synchronized to a first of said first predetermined time after the predetermined period has passed.

* * * * *